Figure 1:
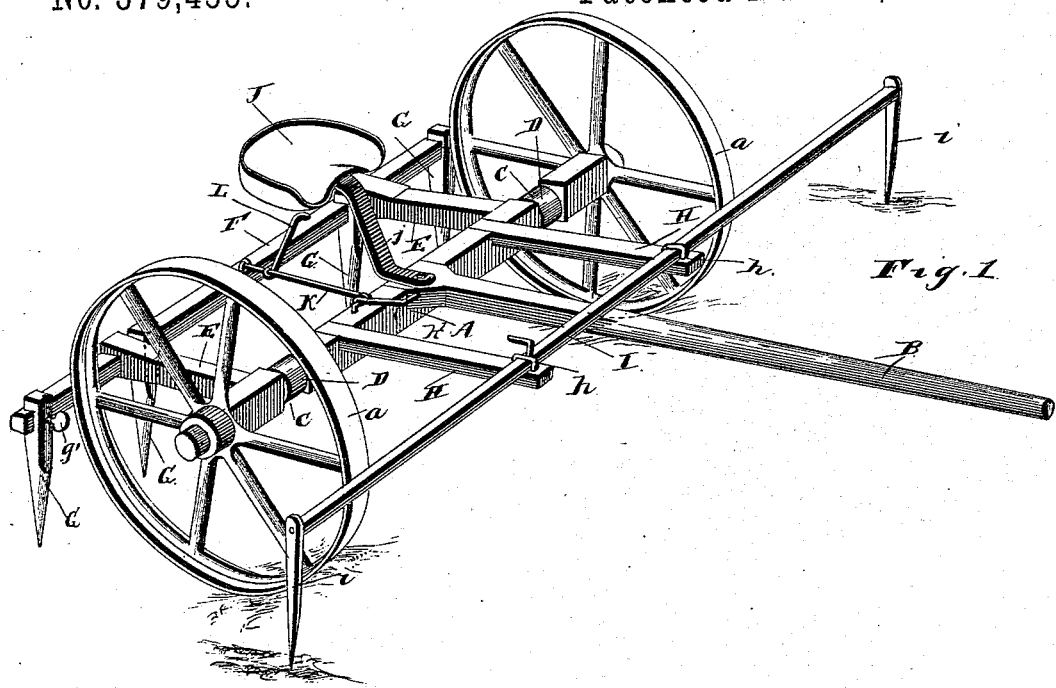

(No Model.)

A. C. FELL & B. F. BLAIR.
LAND MARKER.

No. 379,455. Patented Mar. 13, 1888.

Witnesses.

Inventors
A. C. Fell
B. F. Blair
By their Attorneys

UNITED STATES PATENT OFFICE.

AMOS CALVIN FELL AND BENJAMIN FRANKLIN BLAIR, OF NEWVILLE, INDIANA.

LAND-MARKER.

SPECIFICATION forming part of Letters Patent No. 379,455, dated March 13, 1888.

Application filed November 29, 1887. Serial No. 256,457. (No model.)

*To all whom it may concern:*

Be it known that we, AMOS CALVIN FELL and BENJAMIN FRANKLIN BLAIR, citizens of the United States, residing at Newville, in the county of De Kalb and State of Indiana, have invented new and useful Improvements in Land-Markers, of which the following is a specification.

The invention relates to improvements in land-markers; and it consists in the construction and novel combination of parts, hereinafter described, illustrated in the drawings, and pointed out in the claims hereto appended.

Figure 2:
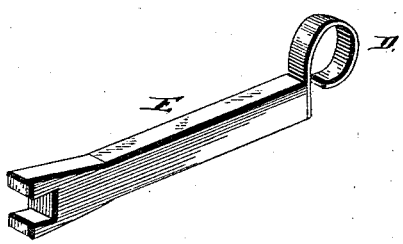
Figure 3:
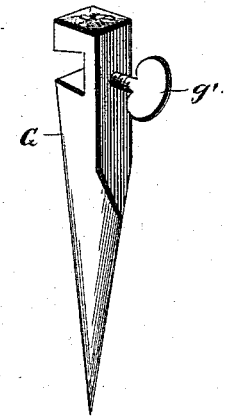

In the accompanying drawings, Figure 1 represents a perspective view of the invention. Figs. 2 and 3 respectively represent a detailed view of one of the marker-bar arms and a detailed view of the attachment of one of the marker-fingers to the marker-bar.

Referring to the drawings by letter, A designates the axle, having the wheels $a\ a$ turning loosely thereon; and B is the tongue, having its rear end secured centrally to the axle. The axle is circumferentially grooved and rounded at points C C, equally distant from the wheels, to afford loose attachment to the metallic looped straps or bands D D, secured to the inner ends of the marker-bar arms E, and which embrace and turn on said reduced and rounded portions.

We do not desire to confine ourselves to the exact mode of making joints between the marker-bar arms and the axle, as any joint that would allow the former to turn up and down on the latter would subserve the desired purpose.

F is the transverse marker-bar, secured to the outer ends of the marker-bar arms and extending on each side equal distances outward from the same; and G G are the marker-fingers, provided with dovetail openings near their upper ends, by means of which they rest and slide on the marker-bar, being fixed in any desired position by the set-screws $g'$, that pass through tapped openings in their inner faces and impinge on the inner surface of the marker-bar. By means of these set-screws the marker-fingers may be spaced as desired. The lower ends of the marker-fingers are pointed, to give a sufficient depth to the marks.

H H are arms that extend forward from the axle at equal distance on each side of the tongue, their rear ends being secured to the axle, and $h\ h$ are longitudinal loops or staples of metal standing at corresponding points from the upper surfaces of said arms near their front ends.

I is a transverse gage-bar that slides within said loops and rests upon the upper surface of the tongue, and $i\ i$ are gage-fingers secured to and depending from the ends of said bar. By allowing one of these fingers to travel in the last mark made the marker-fingers can be easily set to make the succeeding marks parallel to and at the desired distances therefrom.

J is the driver's seat, supported upon its standard $j$, which is secured to the central part of the axle.

K is a lever pivoted at a suitable point of its length upon a bracket or standard secured to the axle, and having the end of its rear arm loosely connected to the marker-bar, as shown, the end of its front arm being provided with a foot-rest, $k'$, by depressing which the driver can raise the marker-bar and attached fingers when turning the machine or moving it from place to place.

If desired, a lifting-rod, L, may have its lower end loosely attached to the rear arm of the lever K and be provided with a hand-hold on its upper end, so that the driver can thereby raise the marker-fingers by hand.

In driving a single horse thills may be substituted for the tongue.

Having described our invention, we claim—

1. In a land-marker, the combination, with the axle, of the transverse marker-bar, the arms having their rear ends secured to the marker-bar and their front ends loosely attached to the axle, so as to turn up and down thereon, the marker-fingers sliding on the marker-bar, and the screws by means of which said fingers are set on said bar after longitudinal adjustment thereon, substantially as specified.

2. The combination, with the axle having the circumferentially-grooved and rounded portions C, of the marker-bar, the arms having their rear ends secured to the marker-bar, the looped straps D, secured to the front ends of said arms and surrounding the grooved and rounded portions of the axle, the marker-fingers G, sliding by means of openings on the marker-bar, the set-screws g', and the lever K, pivoted on a bracket or standard rising from the axle, having the end of its rear bar loosely attached to the marker-bar, and provided on the end of its front arm with a foot-rest within easy reach of the driver, substantially as specified.

3. The combination, with the axle, the marker-bar, and the arms having their rear ends secured to the marker-bar and their front ends loosely attached to the axle, so as to turn up and down thereon, of the arms fixed to and standing forward from the axle, the longitudinal guide and retaining loops secured to the said arms at corresponding points, the gage-bar adjustable laterally with reference to the vehicle, and the gage-fingers secured to and depending from the ends of said bar, substantially as specified.

4. The combination of the axle, the arms secured thereto and projecting forward therefrom, and the gage-bar mounted on the front ends of said arms and adjustable laterally thereon, substantially as set forth.

5. The combination of the axle, the arms mounted loosely thereon and extending rearwardly therefrom, the marker-bar carried by said arms, and the marking-fingers mounted on said marker-bar and longitudinally adjustable thereon, substantially as set forth.

In testimony that we claim the foregoing as our own we have hereto affixed our signatures in presence of two witnesses.

AMOS CALVIN FELL.
BENJAMIN FRANKLIN BLAIR.

Witnesses:
MORTON GARRISON,
JAMES B. BAXTER.